United States Patent [19]
Vianen et al.

[11] Patent Number: 5,455,336
[45] Date of Patent: Oct. 3, 1995

[54] PROCESS FOR THE PREPARATION OF POLYSACCHARIDE

[75] Inventors: Gerardus M. Vianen, Roosendaal; Kees Koerts, Driebergen; Hendrika C. Kuzee, Oost-Souburg, all of Netherlands

[73] Assignee: Cooperatieve Vereniging Suiker Unie U.A., Netherlands

[21] Appl. No.: 985,463

[22] Filed: Dec. 3, 1992

Related U.S. Application Data

[63] Continuation of Ser. No. 540,931, Jun. 20, 1990, abandoned.

[30] Foreign Application Priority Data

Jun. 22, 1989 [NL] Netherlands ............... 8901579

[51] Int. Cl.[6] ............... C07H 1/00; C07H 13/02; C08B 37/00
[52] U.S. Cl. ............ 536/18.5; 536/18.6; 536/115; 536/119; 536/120; 536/124
[58] Field of Search ............ 536/18.6, 18.5, 536/119, 115, 120, 124

[56] References Cited

U.S. PATENT DOCUMENTS

| | | | |
|---|---|---|---|
| 3,876,794 | 4/1975 | Rennhard | 426/804 |
| 4,304,768 | 12/1981 | Staub et al. | 514/54 |
| 4,361,100 | 11/1982 | Hinger | 110/238 |
| 4,399,719 | 8/1983 | Chszaniecki et al. | 74/410 |
| 4,484,012 | 11/1984 | Stahl et al. | 536/18.5 |
| 4,683,297 | 7/1987 | Yanami et al. | |
| 4,778,881 | 10/1988 | Nieuwenhuis et al. | 536/119 |
| 4,897,474 | 1/1990 | Bickert | 536/119 |

FOREIGN PATENT DOCUMENTS

| | | |
|---|---|---|
| 2019701 | 12/1990 | Canada. |
| 3234623 | 3/1984 | Germany. |
| 3234622 | 3/1984 | Germany. |
| 248747 | 8/1987 | Germany. |
| 248749 | 8/1987 | Germany. |

OTHER PUBLICATIONS

Della Valle, J. et al., "Relationship of Extrusion Variables with Pressure and Temperature During Twin Screw Extrusion Cooking of Starch," Journal of Food Engineering, vol. 6, pp. 423–444 (1987).

Chemical Abstracts, STN Host, vol. 97, No. 15, published Oct. 11, 1982.

Primary Examiner—Michael G. Wityshyn
Assistant Examiner—Everett White
Attorney, Agent, or Firm—Webb Ziesenheim Bruening Logsdon Orkin & Hanson

[57] ABSTRACT

The invention relates to a process for the preparation of low-calorie polysaccharide derivatives, obtained by feeding a worm shaft reactor, operating at elevated temperature and under elevated pressure, with a mixture of at least a saccharide, a polyol and a food-grade polycarboxylic acid. The products obtained may be added as low-calorie bulking agent to (diet) foodstuffs like puddings, cake etc..

11 Claims, No Drawings

PROCESS FOR THE PREPARATION OF POLYSACCHARIDE

This is a continuation of copending application Ser. No. 07/540,931 filed on Jun. 20, 1990, now abandoned.

The invention relates to a process for the preparation of polysaccharide derivatives by reacting at least a saccharide, a polyol and a polycarboxylic acid, which also acts as catalyst, at elevated temperature.

A process of this type is disclosed in U.S. Pat. No. 3,766,165. More particularly, in this U.S. patent specification a process is described for the preparation of polysaccharide derivatives, according to which d-glucose or maltose, as saccharide, is reacted in the molten state at a temperature of 140°–295° C. and under greatly reduced pressure in the presence of a catalytic amount of at most 10 mol % of a food-grade polycarboxylic acid, for example citric acid, in the absence of water, with the proviso that the water formed during melting and polymerization is removed immediately. A polyol such as sorbitol can also be used in the abovementioned reaction.

In the abovementioned U.S. Pat. No. 3,766,165 it is also stated that the reaction time and the reaction temperature are parameters dependent on one another. In this context it is emphasized that the exposure of the reaction mixture to heat, which takes place in this known process, must be as little as possible since at elevated temperature discoloration, caramelization and degradation phenomena increase with time. In column 5, lines 31–48 of this U.S. patent specification it is put forward that the process in question can be carried out at a reaction temperature of 160° C. for a reaction time of 8 hours or at a reaction temperature of 140° C. for a reaction time of 24 hours, for the same degree of polymerization of the final product. Products similar to those obtained under the abovementioned parameters are also obtained by applying a continuous polymerization in the temperature range of 200°– 300° C. under vacuum for a period of about 10 minutes. However, maintaining the vacuum required in the known process demands extra measures such as the use of peripheral equipment, which is regarded as an inherent disadvantage of the process disclosed in said U.S. Pat. No. 3,766,165.

The Applicant has therefore made attempts to develop a process which can be carried out continuously and with which the desired polysaccharide product can be obtained both in a very short time and without the use of the equipment required for maintaining the vacuum conditions.

Surprisingly, it has been found that the above aim can be achieved if the reactants are fed in the form of a mixture of at least a saccharide, a polyol and a food-grade polycarboxylic acid through a worm shaft reactor operating at elevated temperature and under elevated pressure, a reaction product at a temperature of 140°–300° C. being obtained.

More particularly it is put forward that a highly elevated pressure prevails in the worm shaft reactor used in the process according to the invention, i.e. conditions which are diametrically opposed to the requirement associated with the method of preparation disclosed in U.S. Pat. No. 3,766,165, i.e. that the reaction must be carried out at a highly reduced pressure.

The reaction time required for the abovementioned reaction according to the invention varies from 0.5–4 minutes, advantageously 1–2.5 minutes.

In respect of properties, the product obtained using the process according to the invention in principle corresponds to the product obtained in accordance with the process according to U.S. Pat. No. 3,766,165 or the product described in U.S. Pat. No. 3,876,794, in particular with regard to the reducing value, pH of an aqueous solution of the product, acid equivalent, residual saccharide, polyol and polycarboxylic acid content, levoglucosan and hydroxymethylfurfural formed, non-dialysable fraction, optical rotation and Gardner colour; both abovementioned U.S. patent specifications are incorporated here as reference.

With the process according to the invention it is possible, for example, to pass a pulverulent mixture of glucose, sorbitol and citric acid through a worm shaft reactor within a period of a few minutes to obtain a product which is at a temperature of about 200° C. and has the following characteristics:

glucose content $\leq 6\%$ by weight, advantageously $\leq 4\%$ by weight sorbitol content $\leq 2.5\%$ by weight, advantageously $\leq 2\%$ by weight citric acid content $\leq 0.75\%$ by weight, advantageously $\leq 0.5\%$ by weight levoglucosan content $\leq 4\%$ by weight, advantageously $\leq 2.5\%$ by weight solubility in water: about 100% by weight or less, depending on the amount of polycarboxylic acid used pH of a 10% solution in water: about 3

Gardner colour: $\leq 10$, advantageously $\leq 5$, in particular $\leq 3$.

Glucose, maltose or maltotriose, preferably glucose, are advantageously mentioned as the saccharide. The glucose can, in this case, be used in the form of the anhydrous product or of the monohydrate.

The polyol to be used in the process according to the invention must be a product acceptable in the foodstuffs industry, i.e., a food-grade product, such as, for example, glycerol, erythritol, xylitol, mannitol, galactitol and, preferably, sorbitol. The amount of polyol is, for example, 4.5–20% by weight, advantageously 8–12% by weight, calculated for the total mixture.

The catalyst used is a polycarboxylic acid acceptable in the foodstuffs industry, i.e.,a food-grade polycarboxylic acid, such as fumaric acid, tartaric acid, terephthalic acid, succinic acid, adipic acid, itaconic acid or the anhydrides of the latter three acids, and preferably citric acid. Depending on the amount of catalyst used, a product is obtained which may be completely or only partially soluble in water. Roughly it can be stated that for the preparation of a water-soluble product an amount of at least 0.1, preferably 0.25–2.5, % by weight of polycarboxylic acid can be used, and for the preparation of a product which is partially soluble or insoluble in water a larger amount of, for example, at most about 10% by weight of polycarboxylic acid can be used, calculated relative to the total mixture.

In accordance with the process according to the invention, therefore, mixtures of 70–95.4% by weight, preferably 85.5–91.75% by weight, of saccharide, preferably d-glucose 0.1–10% by weight, preferably 0.25–2.5% by weight, of polycarboxylic acid, preferably citric acid, and 4.5–20% by weight, preferably 8–12% by weight, of polyol, preferably sorbitol are advantageously used.

The starting material used in the form of a powder usually has a particle size of less than 3 mm, preferably 0.05–1 mm.

The process according to the invention can be carried out with the aid of worm shaft reactors or extruder devices with one or two shafts, which are generally known from the state of the aft. A Clextral BC-45 twin screw extruder (manufacturer: Clextral S.A., Firminy-Cedex, France) has been used in the examples; however, other known worm shaft reactors can also be used.

In the worm shaft reactors or extruder devices which are to be used in the process according to the invention and which force-convey materials, an intensive mixing of the reagents takes place, it being possible to achieve a good temperature control and a good heat transfer in a simple manner. Surprisingly, in such a worm shaft reactor a mixing and reaction takes place which is such that an end product with outstanding properties is obtained within a relatively short reaction time of, for example, 0.5–4 minutes, advantageously 1–2.5 minutes.

Although the design of the worm shaft reactor to be used in the process according to the invention can vary within wide limits, worm shaft reactors which have a compression ratio of 1.1–3 and a length/diameter ratio of the worm of 10–30 are preferably used.

As stated, the temperature of the casing of the worm shaft reactor is adjusted such that the product obtained from the reactor has a temperature of 140°–300° C., preferably 180°–220° C.

The advantages of the process according to the invention over the process disclosed in U.S. Pat. No. 3,766,165 are numerous. Examples of these advantages are, inter alia, that the process according to the invention is "simple" to carry out from the technological standpoint;

can be carried out continuously requires only a very short reaction time and with this process undesirable side reactions frequently occur to a lesser degree, which is reflected, for example, in a better Gardner colour.

The products obtained in accordance with the process according to the invention can be added, optionally in the neutralized form, as a low-calorie bulking agent to diet foodstuffs and the like in order to impart to these desired characteristics such as texture and the like, which usually originate from high calorie products such as sugar and/or fat. Examples of such foodstuffs are puddings, cake, cookies, chewing gum, sweets, dressings, salads, mixed ices and hard and soft candy.

The invention is explained in more detail with the aid of the examples below; however, these examples must not be taken as restrictive.

EXAMPLE I

A mixture of 89% by weight of anhydrous glucose, 10% by weight of sorbitol and 1% by weight of citric acid monohydrate was mixed homogeneously in the form of a powder with a particle size of less than 1 mm and then metered at a rate of 20 kg/hour into an extruder (Clextral BC-45); a "1 metre version" consisting of four 25-cm segments, which segments were each provided with a heating Jacket, the capacity of which, being from the inlet to the outlet orifice, had a value of 5, 7, 5 and 7 kWh; the shafts rotated at the same time. For a rotational speed of the shafts of 100 revolutions/min. (rpm), the temperature of the jacket was regulated such that the outlet temperature of the extruded material was 200° C. The pressure in the extruder had a value of about 5 bar. The residence time of the mixture in the extruder was about 1.5 min. The pale yellow product obtained had a Gardner colour of 4.5 (10% by weight solution) and a composition of:
glucose: 2.95% by weight
sorbitol: 1.8% by weight
levoglucosan: 2.15% by weight
citric acid: 0.35% by weight,
the remainder being polydextrose.

The product obtained was completely soluble in water.

EXAMPLE II

The mixture used in Example I was metered at a rate of 25 kg/h into an extruder (Clextral BC-45). The rotational speed was 50 rpm. The jacket temperature of the extruder was adjusted such that the temperature of the extruded material obtained was 190° C. The residence time of the mixture in the extruder was about 2 min. The pressure in the extruder had a value of about 9 bar.

The pale yellow product obtained had a Gardner colour of 1.5–2 (10% by weight solution) and a composition of:
glucose: 5.1% by weight
sorbitol: 2.1% by weight
levoglucosan: 1.95% by weight
citric acid: 0.65% by weight,
the remainder being polydextrose.

The product was completely soluble in water.

EXAMPLE III

A mixture of 90% by weight of glucose monohydrate, 9%.by weight of sorbitol and 1% by weight of citric acid (dry) was mixed homogeneously in powder form and then metered at a rate of 25 kg/h into an extruder (Clextral BC-45). At a rotational speed of 200 rpm, the jacket temperature of the extruder was adjusted such that the outlet temperature of the extruded material was 203° C. The residence time of the mixture in the extruder was about 1 min. The pressure in the extruder had a value of about 4 bar.

The pale yellow product obtained had a Gardner colour of 3.5 (10% by weight solution) and a composition of:
glucose: 6.0% by weight
sorbitol: 2.4% by weight
levoglucosan: 2.3% by weight
citric acid: 0.55% by weight,
the remainder being polydextrose.

EXAMPLE IV

A mixture of 90% by weight of glucose monohydrate, 4% by weight sorbitol and 6% by weight citric acid (dry) was homogeneously mixed in powder form and then metered at a rate of 25 kg/h into an extruder (Clextral BC-45). At a rotational speed of 200 rpm, the jacket temperature of the extruded was adjusted such that the outlet temperature of the extruded material was 210° C. The residence time of the mixture in the extruder was about 1 minute and the pressure in the extruder had a value of about 3 bar. The water-soluble portion of the product obtained, which was 60% soluble in water, had a Gardner colour of about 10 (10% by weight solution).

We claim:

1. Process for the preparation of polysaccharide derivatives by reacting a saccharide, a polyol and a polycarboxylic acid, which also acts as catalyst, at an elevated temperature in the range of 140°–300° C., comprising feeding a mixture of at least a saccharide selected from the group consisting of monosaccharides, disaccharides and trisaccharides, a polyol selected from the group consisting of sorbitol, glycerol, erythritol, xylitol, mannitol and galactitol and a food-grade polycarboxylic acid selected from the group consisting of citric acid, fumaric acid, tartaric acid, terephthalic acid, succinic acid, adipic acid, itaconic acid, succinic acid anhydride, adipic acid anhydride and itaconic acid anhydride through a worm shaft reactor operating at said elevated temperature and under elevated pressure, in excess of ambient pressure, corresponding to the compression ratio of the worm shaft reactor, a reaction product being obtained in 0.5–4 minutes and further being obtained at a temperature of 140°–300° C.

2. Process according to claim 1, in which the temperature of the product issuing from the worm shaft reactor is 180°–220° C.

3. Process according to claim 1 or 2, in which a worm shaft reactor has a compression ratio of 1.1:3.

4. Process according to claim 1 or 2, in which the length/diameter ratio of the worm shaft reactor has a value of 10:30.

5. Process according to claim 1, in which the mixture comprises 70–95.4% by weight of saccharide;

0.1–10% by weight of polycarboxylic acid; and 4.5–20% by weight of polyol.

6. Process according to claim 5, in which the mixture comprises 85.5–91.75% by weight of saccharide;

0.25–2.5% by weight of polycarboxylic acid; and

8–12% by weight of polyol.

7. Process according to claim 5, in which the saccharide is d-glucose, maltose or maltotriose, the polycarboxylic acid is citric acid and the polyol is sorbitol.

8. Process according to claim 1 or 5, in which the mixture is in the form of a pulverulent mixture.

9. Process according to claim 8, in which the particle size of the pulverulent mixture is 0.05–1 mm.

10. Process according to claim 1 or 5, in which the mixture is passed through the worm shaft reactor within a period of 1–2.5 min.

11. Process for the preparation of polysaccharide derivatives by reacting a saccharide, a polyol and a polycarboxylic acid, which also acts as catalyst, at an elevated temperature in the range of 140°–300° C., comprising feeding a mixture of at least a saccharide selected from the group consisting of monosaccharides, disaccharides and trisaccharides, a polyol selected from the group consisting of sorbitol, glycerol, erythritol, xylitol, mannitol and galactitol and a food-grade polycarboxylic acid selected from the group consisting of citric acid, fumaric acid, tartaric acid, terephthalic acid, succinic acid, adipic acid, itaconic acid, succinic acid anhydride, adipic acid anhydride and itaconic acid anhydride through a worm shaft reactor operating at said elevated temperature and under an elevated pressure of from in excess of ambient pressure up to about 9 bar, a reaction product being obtained in 0.5–4 minutes and further being obtained at a temperature of 140°–300° C.

* * * * *